US009099776B2

(12) United States Patent
Vasavada et al.

(10) Patent No.: US 9,099,776 B2
(45) Date of Patent: Aug. 4, 2015

(54) METHOD FOR ITERATIVE ESTIMATION OF GLOBAL PARAMETERS

(75) Inventors: Yash Vasavada, Gaithersburg, MD (US); Xiaoling Huang, Boyds, MD (US); Ambarish Purohit, Boyds, MD (US); Channasandra Ravishankar, Clarksburg, MD (US); John E. Corrigan, III, Chevy Chase, MD (US)

(73) Assignee: Hughes Network Systems LLC, Germantown, MD (US)

( * ) Notice: Subject to any disclaimer, the term of this patent is extended or adjusted under 35 U.S.C. 154(b) by 631 days.

(21) Appl. No.: 13/403,532

(22) Filed: Feb. 23, 2012

(65) Prior Publication Data

US 2012/0218141 A1 Aug. 30, 2012
US 2013/0044024 A2 Feb. 21, 2013

Related U.S. Application Data

(60) Provisional application No. 61/447,439, filed on Feb. 28, 2011.

(51) Int. Cl.
*H04B 1/00* (2006.01)
*H04B 15/00* (2006.01)
*H01Q 3/26* (2006.01)

(52) U.S. Cl.
CPC ...................................... *H01Q 3/267* (2013.01)

(58) Field of Classification Search
USPC .............. 455/63.1, 67.11, 67.14, 67.16, 63.4, 455/66.1
See application file for complete search history.

(56) References Cited

U.S. PATENT DOCUMENTS

| 2003/0050016 A1* | 3/2003 | Boros et al. ................... 455/67.4 |
| 2006/0052062 A1* | 3/2006 | Heddergott et al. ........ 455/67.11 |
| 2007/0004337 A1* | 1/2007 | Biswas et al. ................ 455/63.1 |
| 2007/0287385 A1* | 12/2007 | Stephenne ................ 455/67.11 |
| 2010/0304687 A1* | 12/2010 | Azadet et al. .............. 455/67.16 |

OTHER PUBLICATIONS

Agee, "The Least-Squares CMA: A New Technique for Rapid Correction of Constant Modulus Signals", Proc. IEEE ICASSP, 1986, pp. 19.2.1-19.2.4.
Annamalai et al., "Unified Analysis of Generalized Selection Diversity with Normalized Threshold Test per Branch", IEEE WCNC Conference, 2003.
Talwar et al., "Blind Separation of Synchronous Co-Channel Digital Signals Using an Antenna Array. Part I. Algorithms", IEEE Trans Signal Processing, May 1996, vol. 44, pp. 1184-1197.

* cited by examiner

*Primary Examiner* — Ping Hsieh
(74) *Attorney, Agent, or Firm* — K&L Gates LLP

(57) ABSTRACT

A method for iterative estimation of a set of unknown channel parameters in a beamforming network including determining a first order estimate of offsets at measurement nodes and an estimate of the confidence in the initial estimate of the measurement nodes' offsets, and iterating, until a desired estimation accuracy is obtained, determining an improved estimate of a parameter set, and the confidence in the estimates, using the prior estimate of the offsets at the measurement nodes and determining an improved estimate of the offsets at the measurement nodes and the associated confidence values using the prior estimate of the parameter set and the corresponding confidence values.

17 Claims, 13 Drawing Sheets

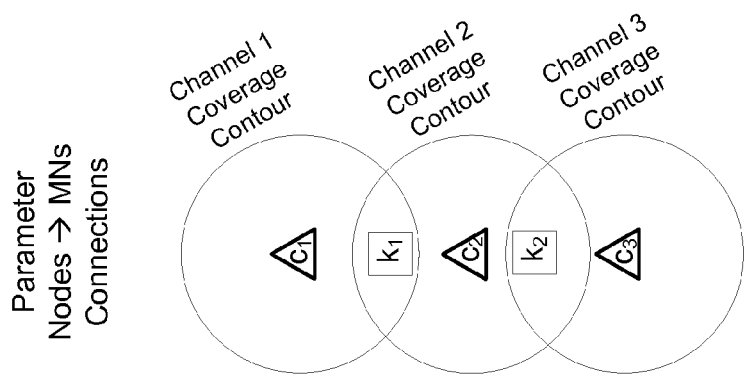
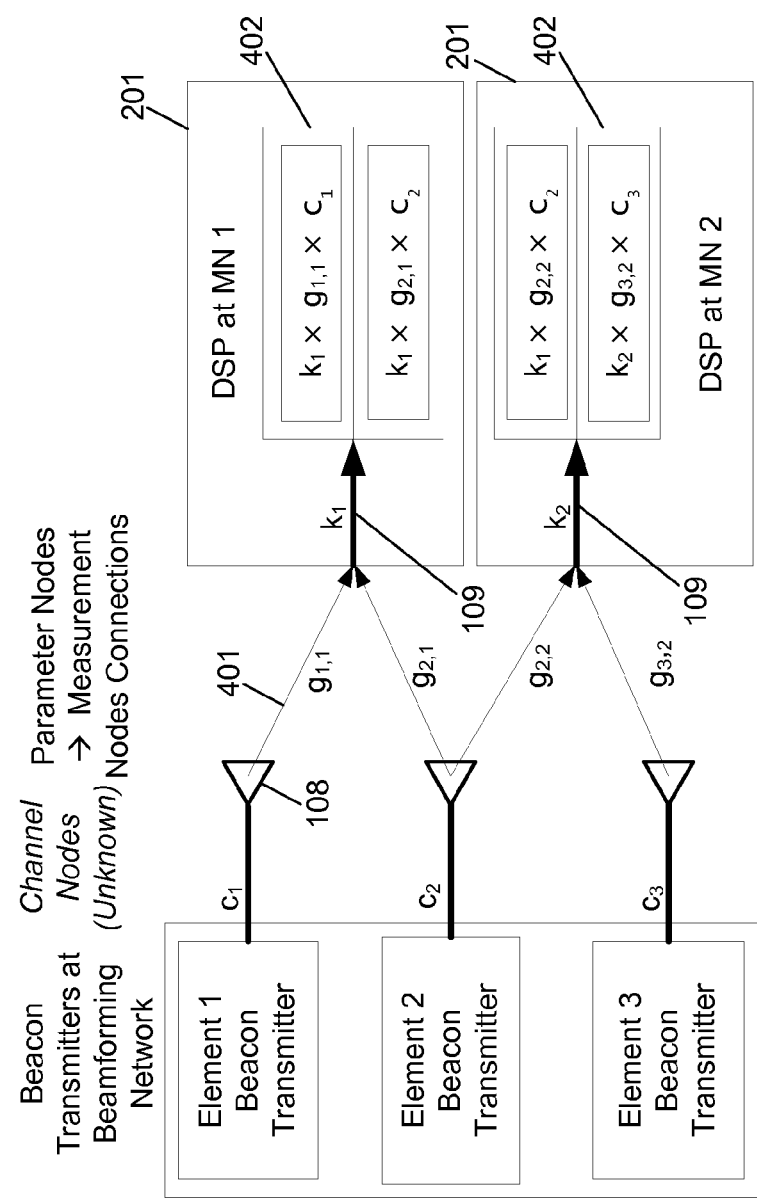
FIG. 6b
FIG. 6a

FIG. 9

| | | | | | | | | | | | |
|---|---|---|---|---|---|---|---|---|---|---|---|
| 5 | 5 | 5 | 5 | 5 | 5 | 5 | 5 | 4 | 3 | 2 | 1 |
| 5 | 5 | 5 | 5 | 5 | 5 | 5 | 4 | 3 | 2 | 2 | 1 |
| 5 | 5 | 5 | 5 | 5 | 4 | 4 | 3 | 2 | 2 | 1 | 1 |
| 4 | 5 | 5 | 4 | 4 | 4 | 3 | 2 | 2 | 1 | 1 | 1 |
| 4 | 4 | 3 | 4 | 3 | 3 | 2 | 2 | 1 | 1 | 1 | 1 |
| 4 | 4 | 3 | 3 | 2 | 2 | 2 | 1 | 1 | 1 | 1 | 1 |
| 3 | 3 | 3 | 2 | 2 | 2 | 1 | 1 | 1 | 1 | 1 | 2 |
| 3 | 2 | 2 | 2 | 2 | 1 | 1 | 1 | 1 | 1 | 2 | 2 |
| 2 | 2 | 2 | 2 | 1 | 1 | 1 | 1 | 1 | 2 | 2 | 3 |
| 2 | 2 | 2 | 1 | 1 | 1 | 1 | 1 | 2 | 2 | 3 | 3 |
| 2 | 2 | 1 | 1 | 1 | 1 | 1 | 2 | 2 | 3 | 3 | 4 |
| 2 | 1 | 1 | 1 | 1 | 1 | 2 | 2 | 3 | 3 | 4 | 4 |
| 1 | 1 | 1 | 1 | 1 | 2 | 2 | 3 | 3 | 4 | 4 | 5 |
| 1 | 1 | 1 | 1 | 2 | 2 | 3 | 3 | 4 | 4 | 5 | 5 |
| 1 | 1 | 1 | 2 | 2 | 3 | 3 | 4 | 4 | 5 | 5 | 5 |

Measurement Nodes (MNs)

METHOD FOR ITERATIVE ESTIMATION OF GLOBAL PARAMETERS

CROSS-REFERENCE TO RELATED APPLICATION

This application claims priority on the basis of U.S. Provisional Patent Application No. 61/447,439, filed on Feb. 28, 2011. The entire disclosure of the provisional patent application is incorporated herein by this reference.

BACKGROUND

Beamforming networks, such as a phased-array beamforming network, may require the calibration of the elements of the antenna array. This may involve the removal of any unknown and undesired amplitude and phase offsets between the antenna array elements. For example, in the return link of a Ground-Based Beamforming (GBBF) network of a satellite communication system, calibration may be achieved by having several geographically separated Beacon Transmitters (BT) transmitting calibration beacon signals on each antenna element path and received by a single Measurement Node (MN). Each BT may have good visibility only to a subset of antenna elements. Furthermore each BT may introduce an unknown nuisance perturbation or an offset in the transmitted signal. The objective may be to calibrate all elements of the antenna array based on measurements made at the MN of signals arriving from geographically separated BTs.

Similarly, in the forward link of a Ground-Based Beam Forming (GBBF) network of a satellite communication system, the array calibration may be achieved by a Beacon Transmitter (BT) transmitting, on each antenna element path, a calibration beacon signal which may be received and measured at several geographically separated Measurement Nodes (MN). Each MN may have good visibility only to a subset of antenna elements. Further, measurement at each MN may be affected by an unknown offset plus varying amounts of noise. The objective may be to calibrate all elements of the antenna array based on measurements made locally at each MN.

Other systems in which data from many separate sensors must be coherently combined and compared in order to determine the required system parameters may use parameter estimation. Such systems include, for example, surveying systems, in which many separate measurements may be combined to make a complete measurement, and various wireless sensor networks. The outputs of each MN may be affected by some unknown nuisance parameter, such as, for example, common measurement instrument errors (such as altitude errors that cannot be measured in surveying systems). Other applications for parameter estimation include channel estimation in Distributed MIMO (D-MIMO) architectures, and blind system identification using multiple MNs in scenarios where parameters representing the system under test may be reliably identified using multiple MNs, and where each individual MN may introduce uncertainty in its measurements. This may include estimating possibly complex-valued voltages in an electric circuit using voltage-meters that are not well calibrated.

Parameter estimation may be accomplished using selective daisy chaining, which may include combining the measurement sets. Selective daisy chaining arrives at the estimation of a parameter set, denoted by a vector, by tracing out several of the least-noisy paths in a bipartite network graph of parameters nodes and BT nodes on the return link (or MNs on the forward link), connecting the parameters nodes and the BTs (or MNs). Selective daisy chaining may lack accuracy and robustness to instrument failures, since it may not use all of the available information in all the measurement sets, and may throw away the information not belonging to the selected paths.

An extension of selective daisy chaining include the maximal daisy chain approach, which may be equivalent to a maximum ratio combining scheme, and path search techniques on the graph problems, in which all the possible paths between each pair of the parameter nodes, through all the different BTs (or MNs), may be traced out and combined using a reliability metric of all the measurements encountered along each path. Selective daisy chaining may be computationally complex, and may be an NP-hard problem that becomes unwieldy as the number of the parameters and BTs (or MNs) increases.

A linear least-squares approach to combining the measurement sets (that are collected using either the BTs on the return link or the MNs on the forward link) may also be used for parameter estimation. However, linear least-squares may have a phase ambiguity problem in the context of the parameter estimation problem in the present invention, and therefore may not be used for the estimation of complex-valued channel coefficients. The linear least-squares approach may be feasible only for the linear model of the measurements.

BRIEF SUMMARY

It is an object of the present invention to provide a method for iterative estimation of global parameters.

In accordance with an aspect of the present invention, a method for iterative estimation of a set of unknown channel parameters in a beamforming network includes determining a first order estimate of offsets at measurement nodes and an estimate of the confidence in the initial estimate of the measurement nodes' offsets, and iterating, until a desired estimation accuracy is obtained, determining an improved estimate of a parameter set, and the confidence in the estimates, using the prior estimate of the offsets at the measurement nodes and determining an improved estimate of the offsets at the measurement nodes and the associated confidence values using the prior estimate of the parameter set and the corresponding confidence values.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF SUMMARY OF THE DRAWINGS

FIG. 6 depicts an exemplary signal processing diagram of a forward link beacon signal measurements at Measurement Nodes (MNs) on the ground;

FIG. 9 depicts an exemplary sparse connectivity diagram for a beamforming network.

DETAILED DESCRIPTION

Beamforming networks may require the estimation of the channel parameters. These parameters may be measured using a set of Beacon Transmitters (BTs) on the return link and Measurement Nodes (MNs) on the forward link. On the return link, the beacon transmission may be from the geographically separated BTs and the beacon reception may be performed at the beamforming network. On the forward link, the beacon transmission may be from the beamforming network and reception may be performed at the geographically separated MNs. Each BT or MN may estimate a local subset of the parameter set, and furthermore, may introduce an unknown nuisance perturbation or an offset in its measurements of the parameter subset. The obtained sets of the local measurements may not be directly used to estimate the entire set of parameters, since the values of each measurement set may be affected by different random nuisance offsets specific to that measurement set. On the forward link, the iterative estimation may begin by using the local measurements of the parameters at an arbitrary MN to estimate the impairment offsets introduced by neighboring MNs. By accounting for the estimated measurement offsets, the parameters may be estimated with greater confidence. The improved estimates of the parameters may then be used to further improve the estimated offsets introduced by the MNs and other impairment sources that are common to an MN, and increase the number of MNs whose offsets are estimated. By performing several such iterations, a global estimate of the entire parameter set may be generated based on the local measurement subsets.

Figure 1:
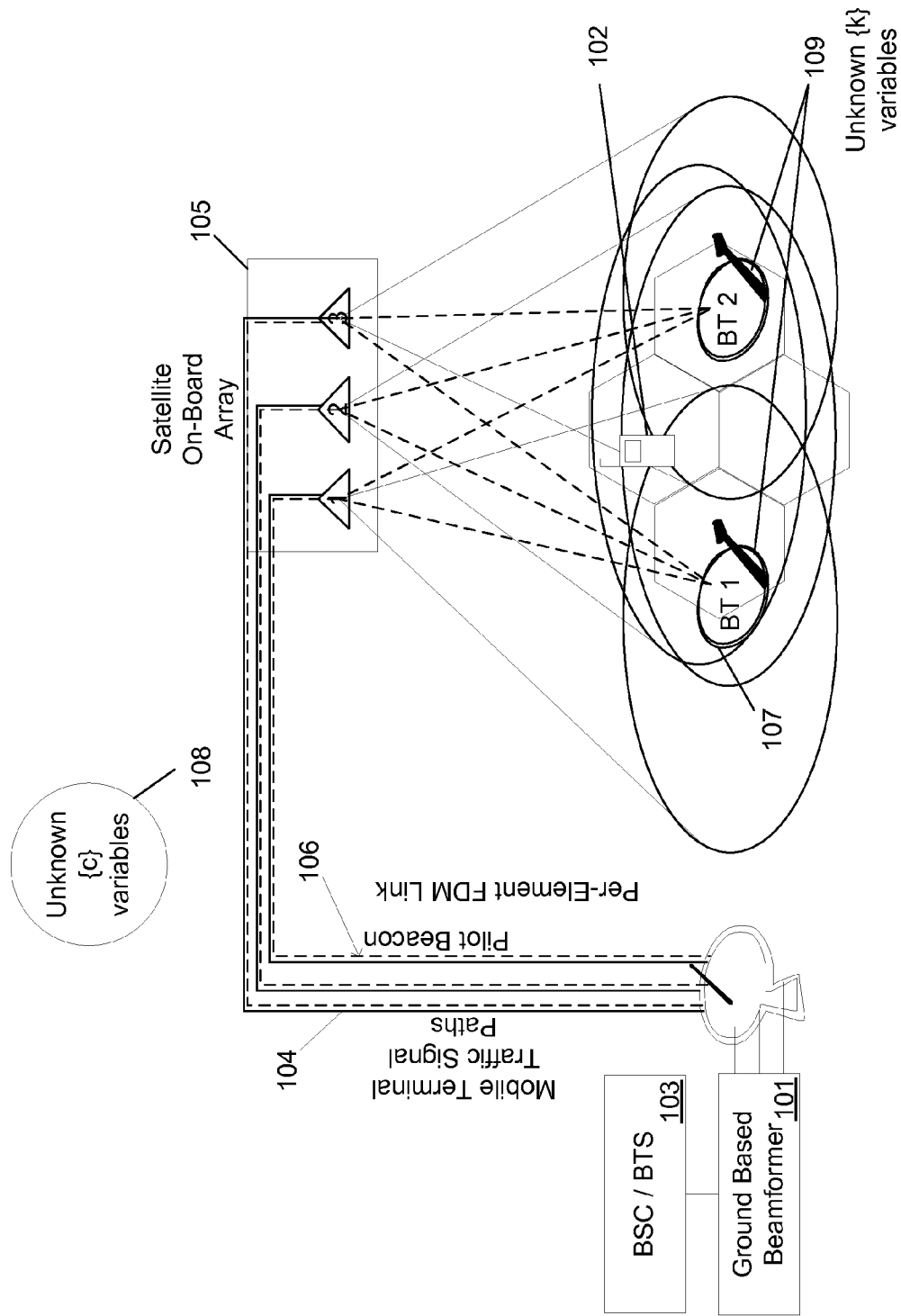
FIG. 1 depicts an exemplary beamforming network.

FIG. 1 depicts an exemplary beamforming network. A beamforming network 101 may provide an improved performance (a greater directivity and diversity gain and a higher carrier to interference ratio) for the user signal traffic flow between a user terminal 102 and a base station control/base transceiver station (BSC/BTS) 103 via a satellite link. To achieve these performance gains, the beamforming network 101 may require calibration of multiple antenna paths 104 between a satellite antenna array 105 and the beamforming network 101. This calibration may be achieved by transmitting a channel sounding pilot beacon 106 on each path from the satellite antenna element array 105 to the ground based beamforming network 101. The channel sounding pilot beacon 106 may be transmitted from multiple Beacon Transmitters (BTs) 107 that may be geographically distributed. The BTs 107 may have to be geographically distributed to cover the footprint of the entire satellite antenna element array 105, since there may only be partial visibility of the full set of array elements (and the channel sounding pilot beacons 106 they carry) at any given geographical location. The channel sounding pilot beacons 106 may measure a local subset of an unknown complex valued calibration parameter set {c} 108. The measurement may also be affected by undesired local BT unknowns {k} 109.

Figure 2:
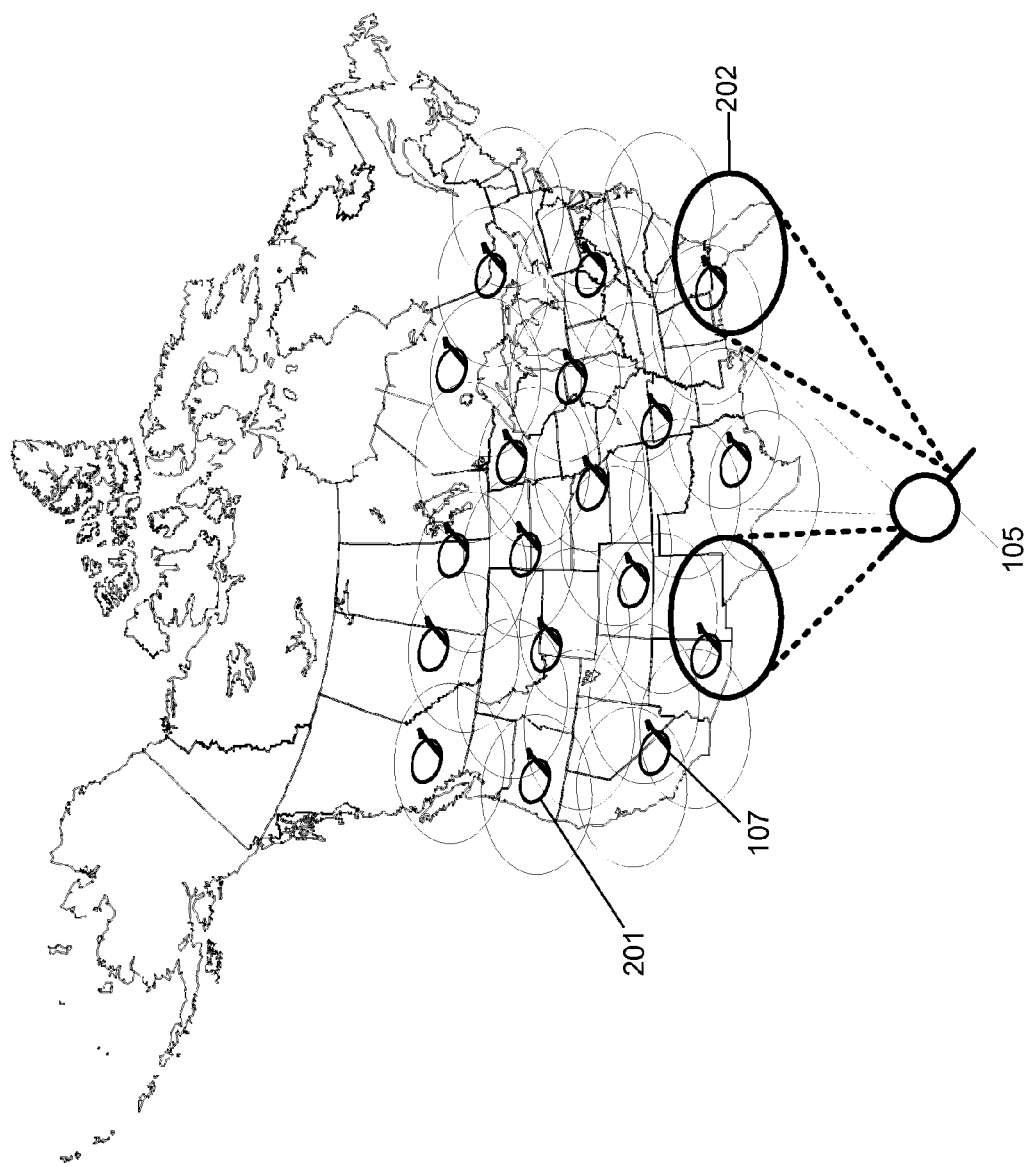
FIG. 2 depicts an exemplary geographical map of a geosynchronous satellite antenna array coverage.

FIG. 2 depicts an exemplary geographical map of a geosynchronous satellite antenna array coverage. The satellite antenna element array 105 of a geosynchronous satellite may be designed to cover a large region, such as the continental United States (CONUS). However, any particular element of the satellite antenna element array 105 may have a foot-print 202 that, at the most, spans only several states of the United States. Multiple BTs 107 may be necessary to measure the channel coefficients corresponding to the entire satellite antenna element array 105. Channel measurements obtained using the BTs 107 may be fed as the input to the iterative parameter estimation algorithm.

Figure 3:
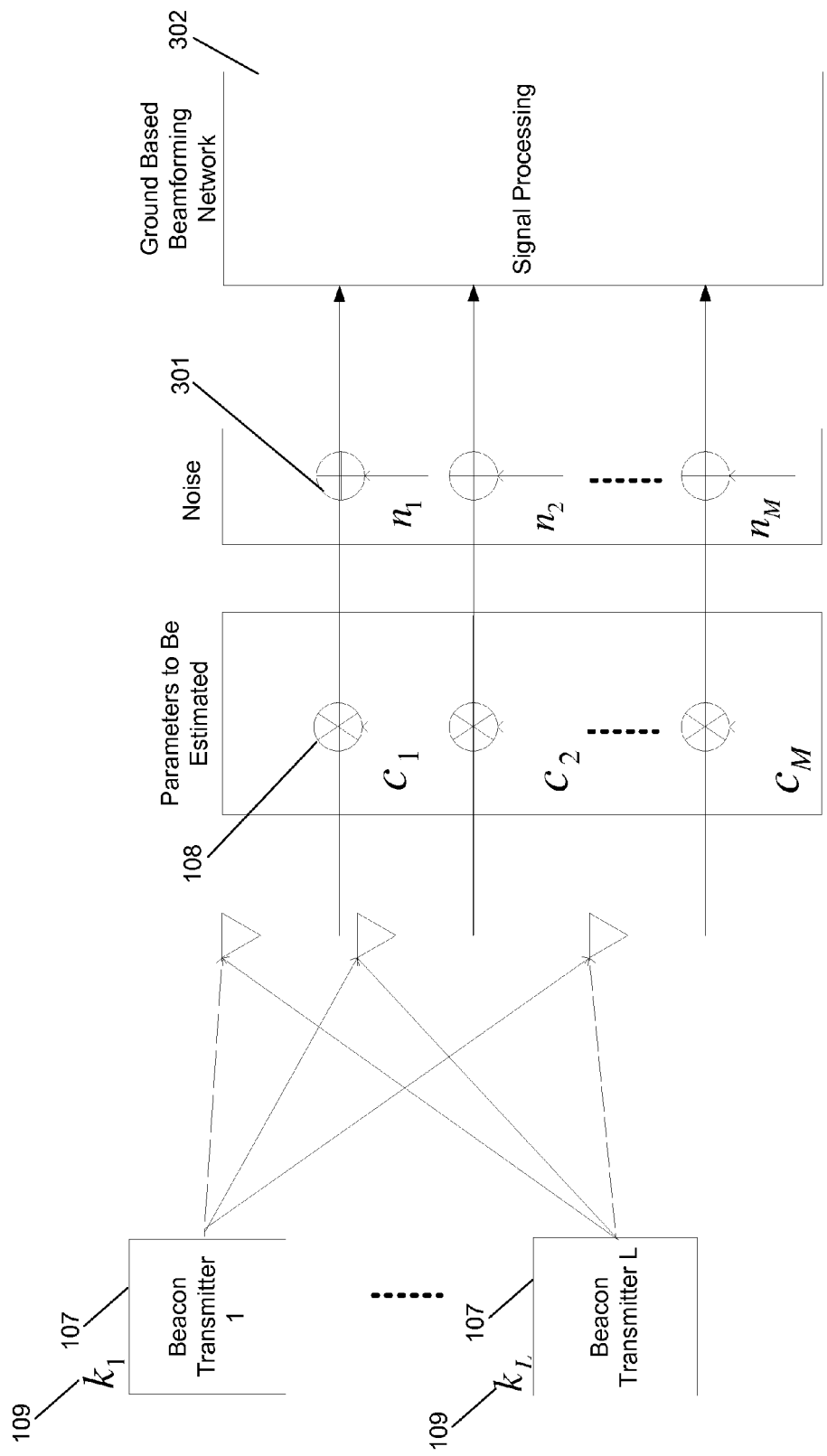
FIG. 3 depicts an exemplary return link signal processing architecture block diagram of the beamforming network.

FIG. 3 depicts an exemplary return link signal processing architecture block diagram of the beamforming network. A channel measurement scheme for the return link of the beamforming network 101 may include L Beacon Transmitters (BTs) 107, which may each experience an offset 109, or perturbation, k, from $k_1$ to $k_L$. The set of parameters to be estimated may be represented by M parameter nodes 108, which may each experience a parameter offset c, from $c_1$ to $c_M$. The beacon signals may be affected by some amount of noise 301. For each parameter 108 measured, there may be noise, from $n_1$ to $n_M$. Signal processing 302 may be any suitable combination of hardware and software for processing the measurements and performing iterative parameter estimation. For example, the signal processing 302 may be a software programmable control processor of a software/cognitive radio In ground-based beamformer systems, the parameters {c} may represent the complex-valued feederlink channel coefficients that may need to be calibrated at the ground based beamformer 101. The variable set {k} may represent the perturbation effects introduced either by the BTs 107 on the return link or MNs 201 on the forward link in the measurement of the parameters {c}.

In a terrestrial D-MIMO system, the parameters {c} may represent the complex-valued symbols transmitted by several distributed antennas to a user terminal. The variable set {k} may represent the perturbation effects introduced by the Access Nodes' (ANs) signal processing device for estimation of the channel state information (CSI) between the distributed antennas and the user terminal.

In a Wireless Sensor Network (WSN), the parameters {c} may represent a set of unknown parameter of interest that is measured by a distributed network of sensor nodes. The variable set {k} may represent the bias effects local to each sensor node.

Figure 4:
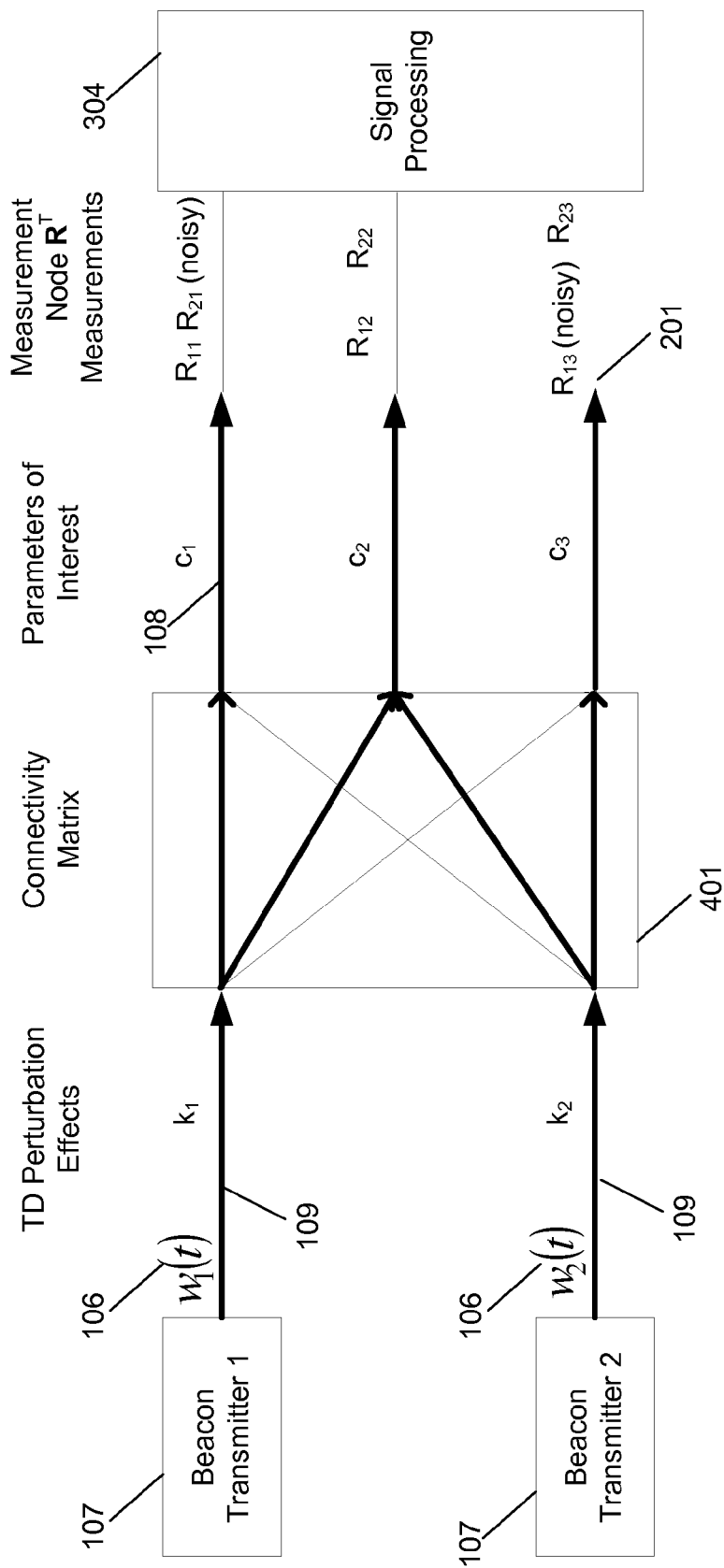
FIG. 4 depicts an exemplary connectivity diagram showing sparse connectivity between channel parameter nodes of interest and BTs used for channel measurement.

FIG. 4 depicts an exemplary connectivity diagram showing sparse connectivity between channel parameter nodes of interest and BTs used for channel measurement. The M parameters to be estimated $\{c_i\}$ may be measured using the set of L BTs 107. Each BT 107 may transmit a channel sounding pilot beacon 106 $w_l(t)$. The set of channel sounding pilot beacons 106 $\{w_l(t)\}$ for the different BTs 107 may be nearly orthogonal. The channel sounding pilot beacon 106 $w_l(t)$ may experience the local BT 107 perturbation $k_l$ 109 at the $l^{th}$ BT 107. The beacon may travel on a path from the BT 107 l to the parameter node 108 m and experience the parameter $c_m$ 108 at the $m^{th}$ parameter node 108. A set of the measurement nodes 201 may measure the amplitude, and the phase, if the parameters are complex-valued, of all the received beacons. The measurement of the beacon signal from $l^{th}$ BT 107 to the $m^{th}$ parameter node 108 may be a binary, possibly nonlinear, function of the BT 107 hardware offset $k_l$ 109 and the parameter of interest $c_m$ 108. The measurements at the measurement nodes 201 may not need to be a linear function, and may be any suitable nonlinear functional model of the two unknowns, for example, they may be modeled as $m_{ij}=f(c_i,k_j)$. To optimally estimate the parameter set $\{c_m\}$, the entire set of the beacon measurements may be processed for all the BTs 107 and all the parameter nodes 108.

Figure 5:
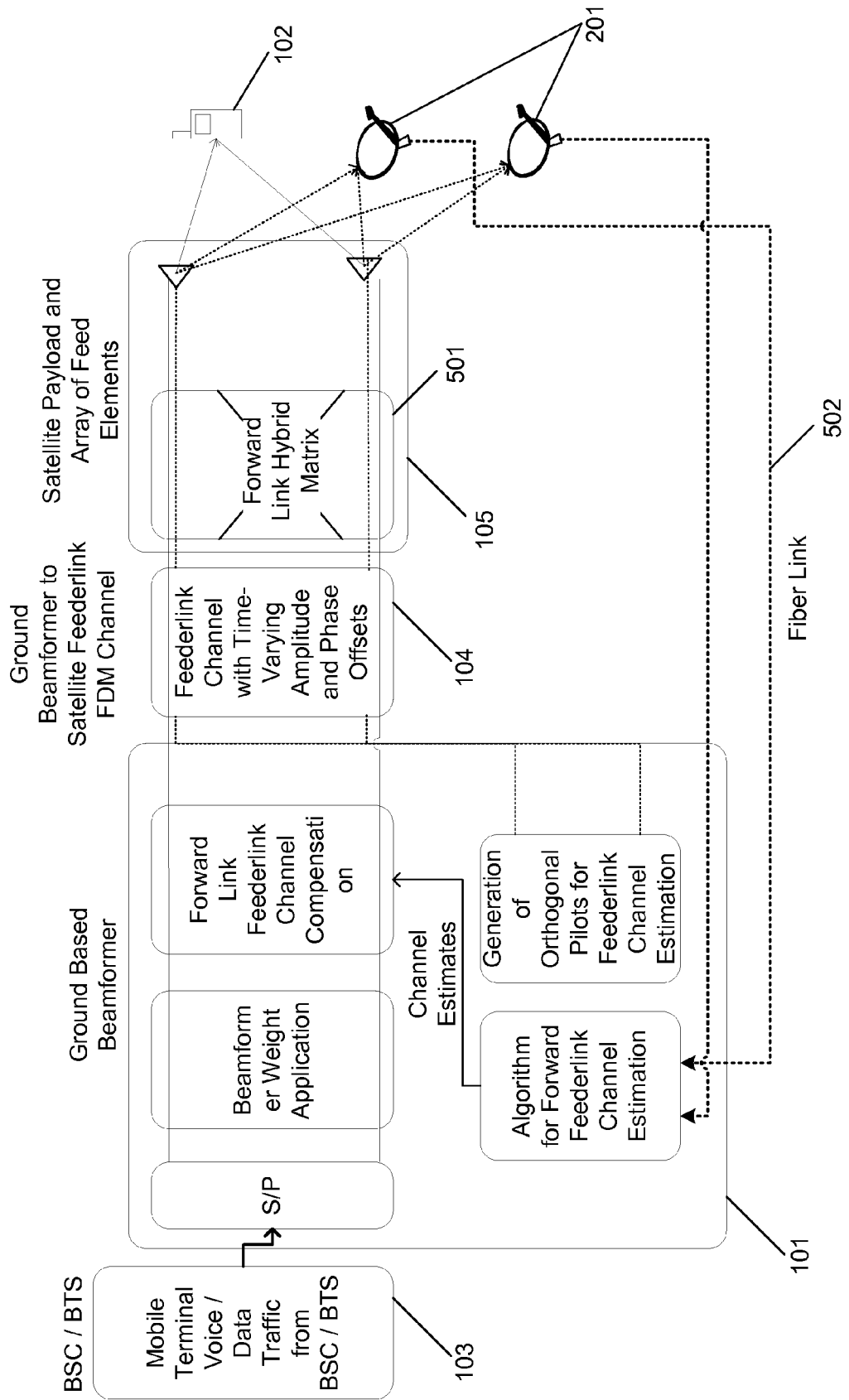
FIG. 5 depicts an exemplary system level architectural diagram of a forward link ground-based beamforming network of a geosynchronous satellite system.

FIG. 5 depicts an exemplary system level architectural diagram of a forward link ground-based beamforming network of a geosynchronous satellite system. As shown in FIG. 5, the output of the iterative parameter estimation algorithm may be used as the adjustments (or the calibration) to the nominal forward link beamforming weights in the geosynchronous satellite's ground-based beamforming network 101.

In a satellite's GBBF network 101, the beamforming coefficients on satellite antenna element array 105 outputs may be applied in a ground based electronics system 101. The individual array element output may be transferred from the satellite to the GBBF 101 on a forward feederlink channel 104. Frequency division multiplexing (FDM) of the different element signals may be used to preserve the signal integrity in a satellite to GBBF 101 forward feederlink channel. The forward feederlink FDM channel 104 may introduce random offsets, for example, the parameter $c_m$ 108. For a proper formulation of the beam at the GBBF 101, these offsets in the feederlink channel may need to be estimated and compensated for. The GBBF 101 on the forward feederlink FDM channel 104 may transmit a set of channel sounding pilot beacon 106 signals that experience the same complex-valued channel coefficients $\{c_m\}$ from the GBBF 101 to the satellite antenna element array 105. These channel sounding pilot beacons may traverse the forward link path that may include the forward feederlink FDM channel 104, the satellite Hybrid Matrix 501, which may be part of the forward link payload, and the forward downlink from the satellite antenna array 105 to the MNs 201 on the ground. The channel sounding pilot beacons 106 may be received at several geographically distributed MNs 201 on the forward link, where their amplitude and phase offsets may be measured. The MNs 201 may transfer the channel measurements to the GBBF 101 over a Wide Area Network (WAN) fiber connections 502. The channel measurements received over the WAN fiber connections 502 may be used as the input to the estimation algorithm at the GBBF 101.

The approach for estimation of the channel parameters $c_m$ 108 may be applicable for both the forward and the return links. Two different instantiations of the estimation algorithm may be used, one for the forward link beamforming parameter estimation, and the second for the return link beamforming parameter estimation. These two instantiations may run in parallel and without any dependence between them. However, the forward link algorithm instantiation may require an extra signal processing function to account for the presence of the Hybrid Matrix 501 at the satellite on the forward link, unlike the return link. Furthermore, the forward link algorithm instantiation, unlike that for the return link, may require the measurement transfer architecture over the Wide Area Network (WAN) fiber connections 502.

FIG. 6 depicts an exemplary signal processing diagram of a forward link beacon signal measurements at Measurement Nodes (MNs) on the ground. Similar to the return link connectivity pattern depicted in FIG. 4, there may also be a sparse connectivity between the MNs 201 and the parameter nodes 108. For example, as depicted in FIG. 6, in the forward link connectivity matrix 401, the first MN 201 l=1 may have good visibility of the first and the second parameter nodes 108 m=1 and 2, and low visibility of the third parameter node 108 m=3. Similarly, the second MN 201 l=2 may have good visibility of the second and third parameter nodes 108 m=2 and 3, and low visibility of the first parameter node 108 m=1. In addition to the sparse connections, the fidelity of the individual connection between one of the MN 201 and one of the parameter nodes 108 may vary. For example, a given MN 201, in general, may have fair visibility of several of the parameter nodes 108, and good visibility to only a few of the parameter nodes 108.

The sparse connectivity and the variable strengths of the individual connections may prevent a direct measurement of any arbitrary parameter $c_m$ relative to any other parameter $c_n$.

Figure 7:
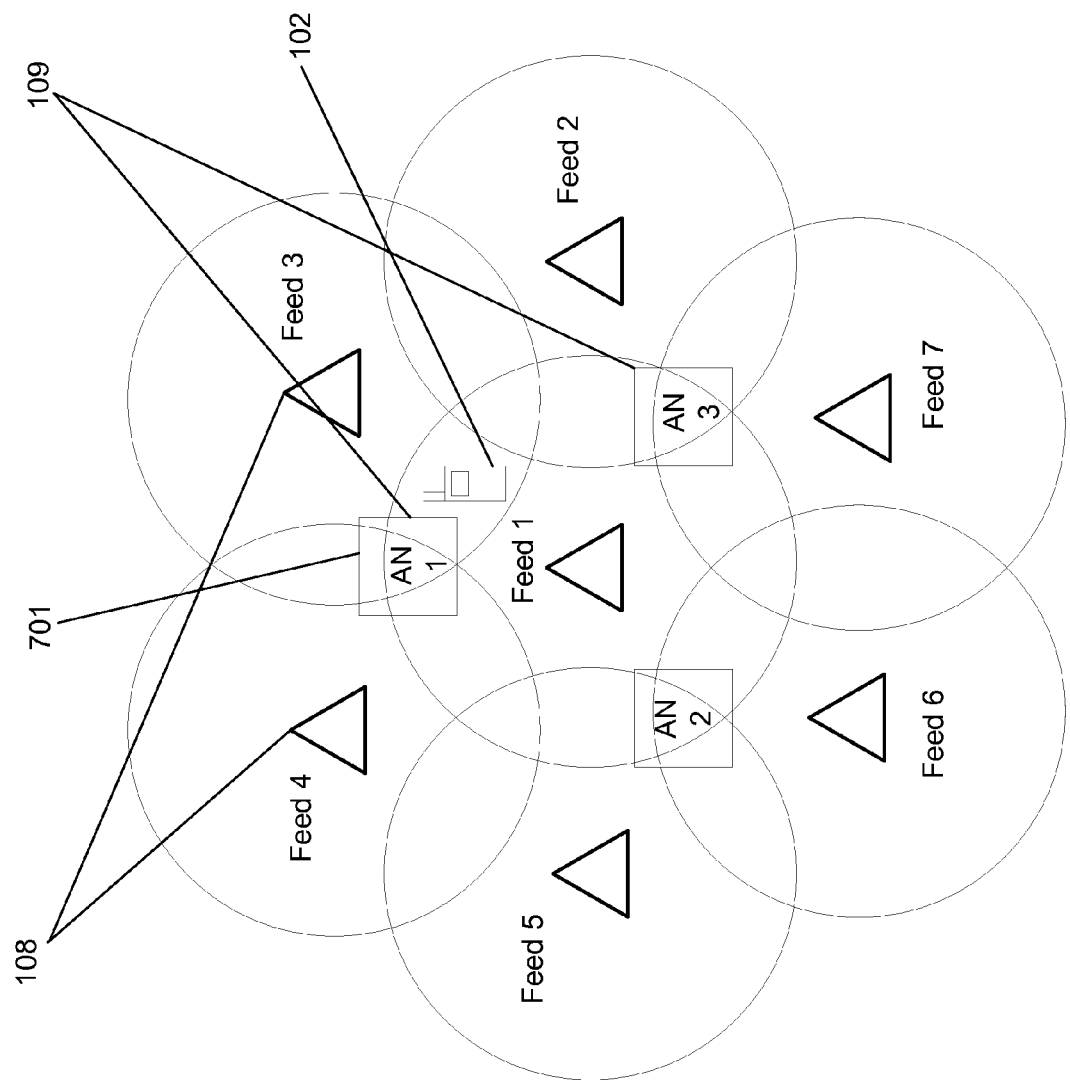
FIG. 7 depicts an exemplary D-MIMO network with a system architecture diagram conceptually equivalent to that of a beamforming network.

FIG. 7 depicts an exemplary D-MIMO network with a system architecture diagram conceptually equivalent to that of a beamforming network. The D-MIMO architectures may be planned as a component of 4G terrestrial networks. The macro-diversity in the D-MIMO terrestrial network may be achieved by geographically separated Access Nodes (ANs) 701. The macro-diversity may provide an improved diversity gain compared to a micro-diversity system in which the antenna elements are collocated, for example, on a single transmission tower, or at a given terminal location, with separation on the order of a wavelength, since the multiple diversity paths may experience uncorrelated fading.

Figure 8A:
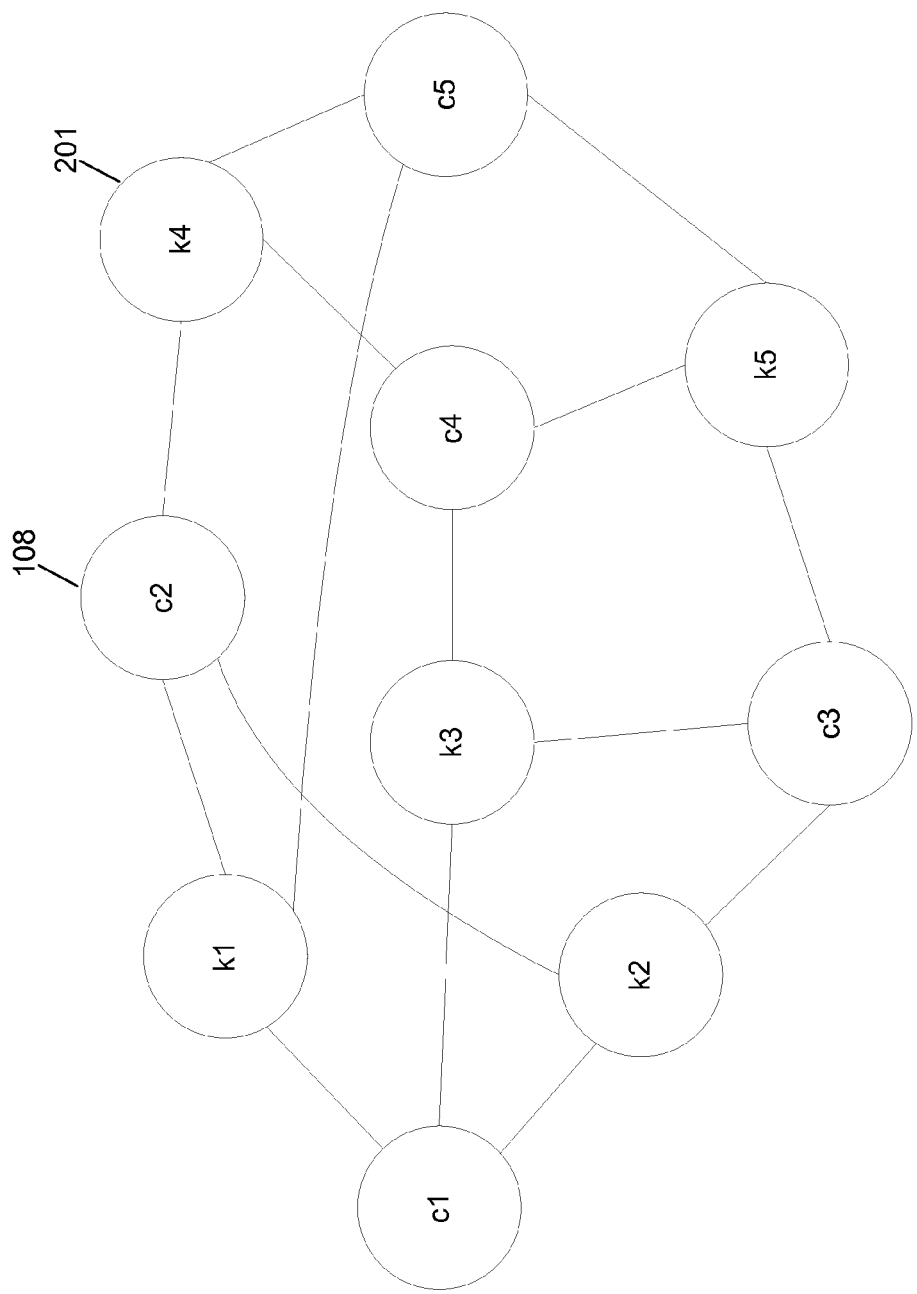
FIG. 8a depicts an exemplary adjacency diagram for connectivity patterns in a beamforming network.
Figure 8B:
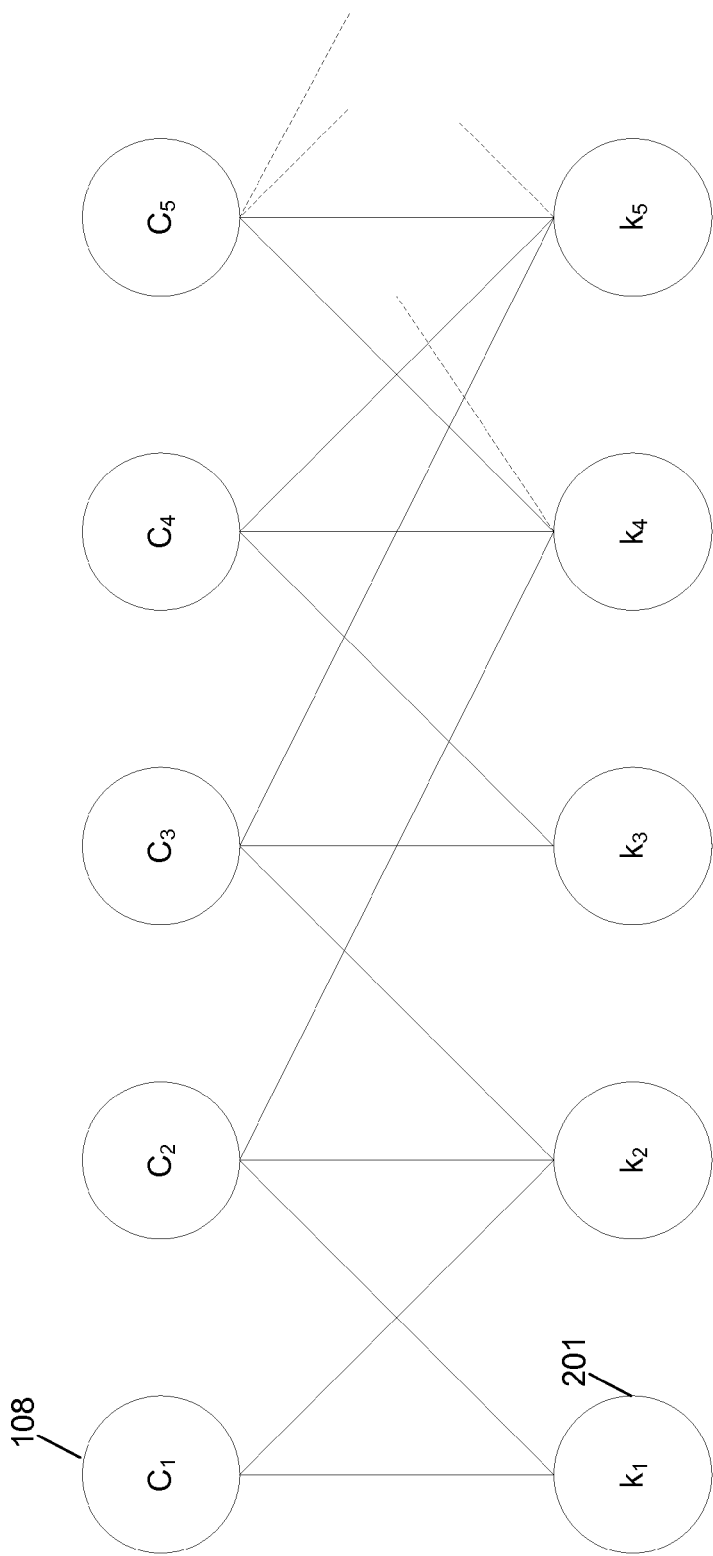
FIG. 8b depicts an exemplary bipartite diagram for connectivity patterns in a beamforming network.

FIG. 8a depicts an exemplary adjacency diagram for connectivity patterns in a beamforming network. FIG. 8b depicts an exemplary bipartite diagram for connectivity patterns in a beamforming network. The parameters to be estimated may be designated as a set $c=\{c_1,c_2,c_3,c_4,c_5, \ldots\}$, which may be complex-valued and may have a phase aspect besides the amplitude. Several subsets of the measurements of these parameters may be denoted as $m_1=k_1\times\{c_1,c_2,c_3, \ldots\}+\{n_{11}, n_{12},n_{13}, \ldots\}$, $m_2=k_2\times\{c_1,c_2,c_3, \ldots\}+\{n_{21},n_{22},n_{23}, \ldots\}$, $m_3=k_3\times\{c_1,c_3,c_4, \ldots\}+\{n_{25},n_{22},n_{24}, \ldots\}$, and so on. $k_i$ may denote an unknown measurement offset such as, for example, local beacon transmitter device perturbation.

In general, the $j^{th}$ measurement at $i^{th}$ measuring device may be $m_{ij}$. The ideal measurement may be $m_{ij}=f(c_i,k_j)$, for example, the output of a binary function $f(.\,.\,.)$, where the admissible functions are the sum, difference, product, ratio, an arbitrary power, and so on. $m_{ij}=k_i^2 c_i^{-1/3}$, $m_{ij}=\sqrt{k_i+c_i}$, may be two of the admissible functions. The function $f(c_i, k_j)$ may be defined as the product function, for example, as $c_i\times k_j$. $n_{ij}$ may denote the noise in the actual measurement $m_{ij}$.

As depicted in FIG. 8a, an adjacency graph that models the connectivity patterns depicted in FIG. 4, FIG. 6 and FIG. 7 may include two types of nodes, the parameter nodes $c_i$ 108, and the measurement nodes (MN) 201 $k_j$, which may also model the unknown measurement offsets of the BTs 107. The graphical connection between the nodes may be sparse. The graph may also be bipartite, as there may be no edge between two nodes of the same type.

Each of the local measurement sets $m_1$, $m_2$, $m_3$, and so on, may contain only partial information of the full parameter set c. This partial information may not be directly merged together to obtain full information about the parameter set c because of the unknown measurement offset $k_i$ affecting each measurement set $m_i$.

A reliable estimate of the parameter set c may be arrived at using iterative parameter estimation. For example, the calibration beacons at the several MNs 201, as depicted in FIG. 6, may be measured to obtain the set of calibration corrections for the entire phased array. The measurements of the calibration beacons may be formulated as $m_i=k_i\times\{c_1,c_2, \ldots\}+\{n_{i1},$ $n_{i2}, \ldots\}$. The desired output of the measurement processing may be an estimate of feed element parameter unknowns, the parameters $\{c_1, c_2, \ldots\}$.

Beacon receiver measurements may be performed by the signal processing 304. Connectivity matrix $G_{L \times M}$ may denote a rectangular matrix of the connection strengths between the L MNs 201 and the M parameter nodes 108. FIG. 9 depicts an exemplary sparse connectivity diagram for a beamforming network. The sparse connectivity diagram may depict connectivity strengths between the parameters nodes 108 and the MNs 201. For binary connections, the entries in the matrix $G_{L \times M}$ may be 1 (on) or 0 (off). A graded connection matrix, as depicted in FIG. 9, may be a generalization of binary connection matrix provided the connection strengths are nominally known.

The measurements $R_{l,m}$ made by the measurement nodes 201 may also form a rectangular matrix $R_{L \times M}$, which may be represented by $R_{L \times M} = K_{L \times L} \times G_{L \times M} \times C_{M \times M} + u_{L \times M}$, where $u_{L \times M}$ may be a rectangular matrix of the additive thermal noise and co-channel interference effects. The value placed in $l^{th}$ row and $m^{th}$ column of the matrix $R_{L \times M}$ may be the measurement nodes 201 measurement of the $l^{th}$ BT 107 transmission signal as the signal arrives at the $m^{th}$ parameter node 108, and may have the form $R_{l,m} = g_{l,m} \times c_m \times k_l + u_{l,m}$, where $g_{l,m}$ is either 1 or 0 for a binary connection matrix.

For a graded connection matrix, the normalization of the measurement $R_{l,m}$ by the nominal value of the connection strength $g_{l,m}$ may be necessary. The scaled measurement $$\tilde{R}_{l,m} = \frac{R_{l,m}}{\tilde{g}_{l,m}}$$

may have errors due to the scaled additive noise and interference, plus errors due to any error in the estimation of the connection strength, which may increase as the connection strength between the BT 107 and the parameter node 108 decreases.

The normalized set of receiver measurements $$\{\tilde{R}_{l,m}\} = \left\{\frac{R_{l,m}}{\tilde{g}_{l,m}}\right\}$$

may form the matrix $\tilde{R}_{L \times M}$. $\tilde{R}_{L \times M} = K_{L \times L} \times 1_{L \times M} \times C_{M \times M} + n_{L \times M}$, where 1 may be a matrix of 1s. The variance $\sigma_{l,m}^2$ of the $(l,m)^{th}$ entry of matrix $n_{L \times M}$ may be approximated as $\sigma_{l,m}^2 \propto |\tilde{g}_{l,m}|^{-2}$, and the signal to noise ration (SNR) may be approximated as $\gamma_{l,m} \propto |\tilde{g}_{l,m}|^2$. Thus, the stronger the connection between the BT 107 and the parameter node 108, the better the reliability of the measurement, which may represented by a small assigned variance. The variance $\sigma_{l,m}^2$ may be set to a high number, and the SNR to a low value, if the measurement $\tilde{R}_{l,m}$ is not available, for example, due to lack of connections or due to a failure of the BT 107.

To perform iterative parameter estimation, multiple BTs 107 may be calibrated, for example, by estimating and removing the relative difference between the perturbations $k_l$ for different BT 107, using a common parameter node 108. A relative estimation of $k_l$ may be obtained from any of the M columns of the matrix $\tilde{R}_{L \times M}$, where each column corresponding to a unique parameter node 108. The different elements of a column of $\tilde{R}_{L \times M}$ may have a common parameter $c_m$, and may only differ due to the terms $k_l$. For example, in a GBBF system with L>4 BTs, BTs 1 through 4 may be calibrated using measurements at the measurement nodes 201.

Once the BTs 107 have been calibrated, multiple parameter nodes 108 may be calibrated using the calibrated BTs 107. For example, the calibrated BTs 1 through 4 may be used to calibrate parameter nodes 1 through 5.

The calibrated parameter nodes 108 may then be used to calibrate different BTs 107 than were originally calibrated. For example, the calibrated parameter nodes 1 through 5 may be used to calibrate BTs 5 through 8. The newly calibrated BTs 107 may then be used to calibrate parameter nodes 108 that were not already calibrated, which may in turn be used to calibrate more BTs 107, and so on until all of the available measurements have been used to optimally estimate the perturbation at the BTs 107 and the value of the parameter nodes 108.

Figure 10:
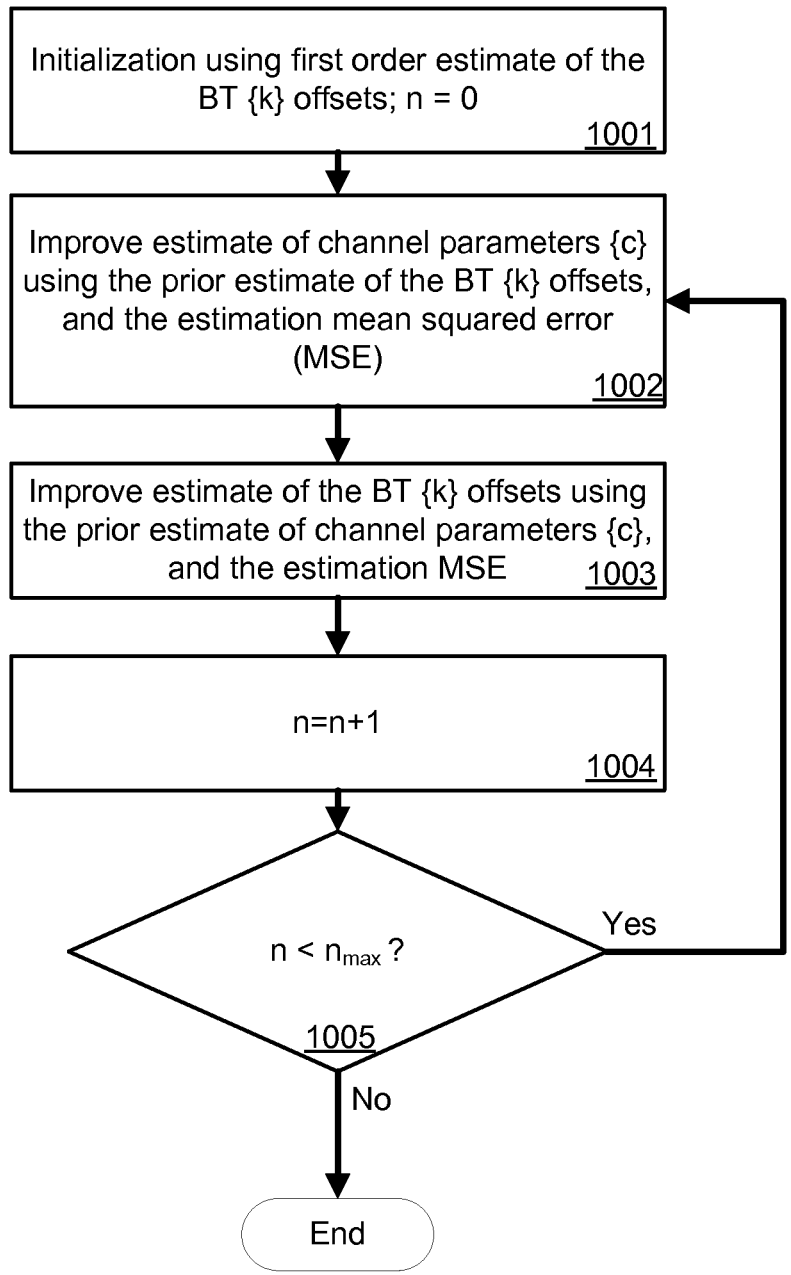
FIG. 10, FIG. 11 and FIG. 12 depict an exemplary flow chart and block diagram of the estimation method described in the present invention
Figure 11:
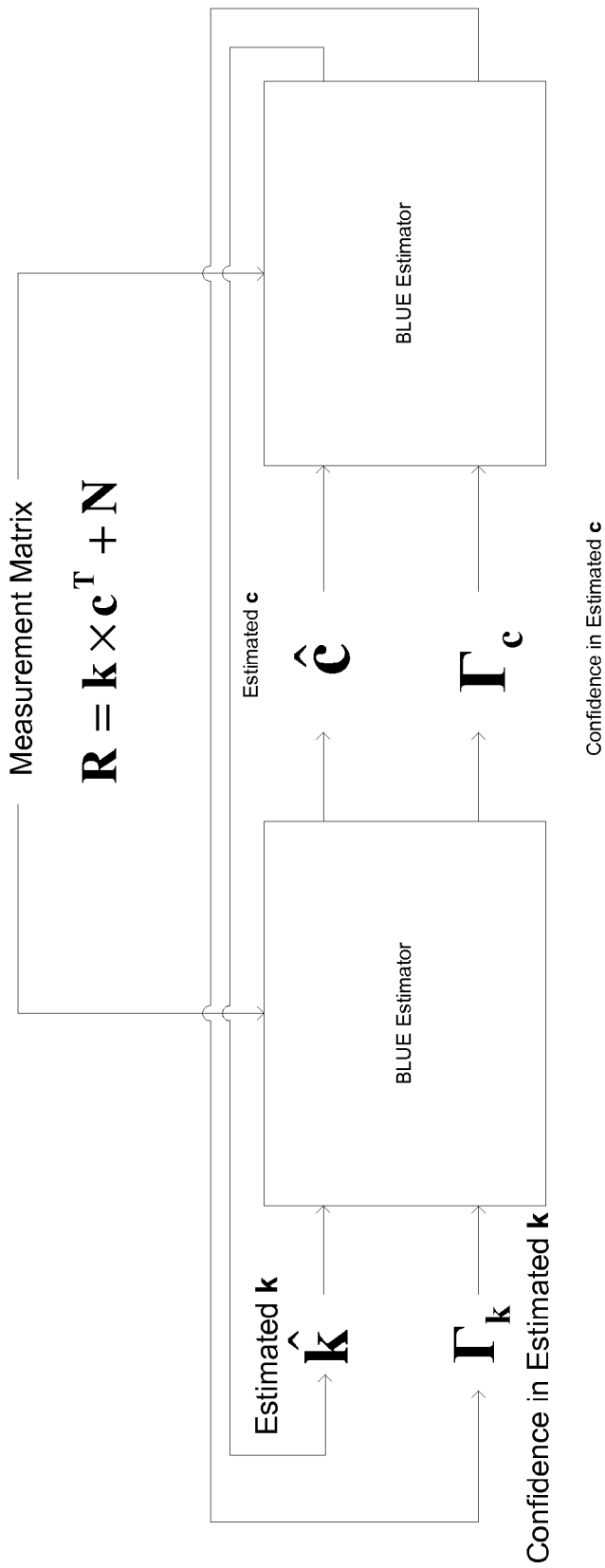
Figure 12:
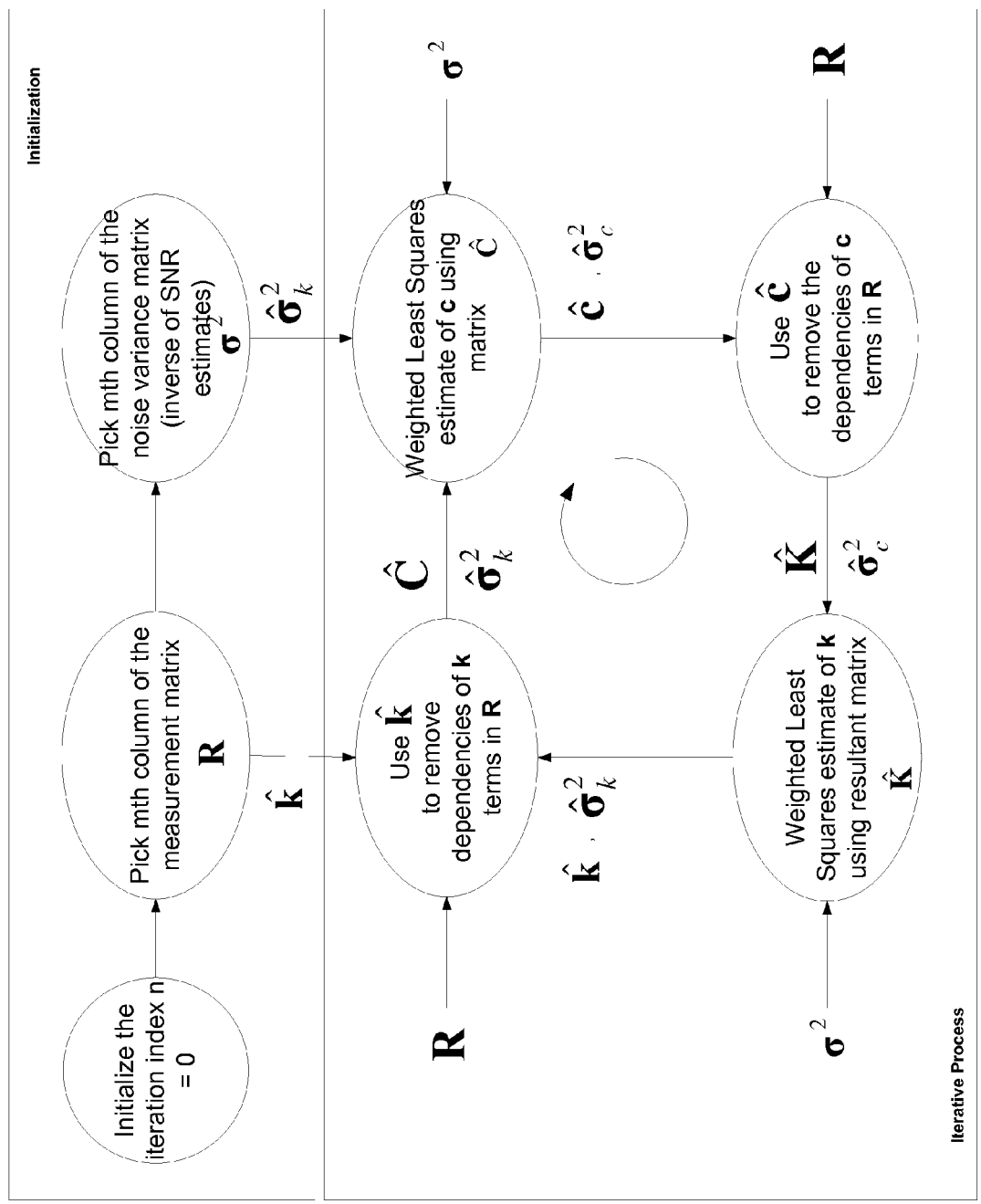

FIG. 10 depicts an exemplary procedure for iterative parameter estimation. In block 1001, the iterative parameter estimation may be initialized with first order estimates of the parameter set and the BT offsets. A counter n may be set to 0. The initialization may be done by using an arbitrary column, for example, the $m^{th}$ column, of the normalized matrix $\tilde{R}_{L \times M}$ of the measurement node 201 measurements to determine a vector $\tilde{k}_m$, according to $\tilde{k}_m = [\tilde{R}(1,m), \tilde{R}(2,m), \ldots, \tilde{R}(L,m)]^T$, where the vector $\tilde{k}_m$ may represent the parameter node 108 m as measured at L BTs 107. Since the matrix $\tilde{R}$ may be $\tilde{R}_{L \times M} = K_{L \times L} \times 1_{L \times M} \times C_{M \times M} + n_{L \times M}$, the vector $\tilde{k}_m$ may be written as $\tilde{k}_m = c_m \times k + n_{k_m}$, where k may be a L×1 vector of the BTs offset terms. The noise vector $n_{k_m}$ may be the $m^{th}$ column of the matrix $n_{L \times M}$, and may represent the estimation of noise in $\tilde{k}_m$. Each column of the matrix $\tilde{R}$ may provide a first-order estimate of the unknown BTs offset terms k.

Depending on the parameter node 108 index m, the elements of the estimation noise vector $n_{k_m}$ may change. For the BTs 107—parameter node 108 pair for which the path connection is strong, for example, the BT 107 has good visibility of the parameter node 108, the variance of the random noise $n_{m,l}$ may be small. When the path connection is weak, the variance may be large.

An equivalent formulation may be obtained for an arbitrary row, for example, the $l^{th}$ row, of the normalized matrix $\tilde{R}_{L \times M}$ of the receiver measurements, $\tilde{c}_l = [\tilde{R}(l,1), \tilde{R}(l,2), \ldots, \tilde{R}(l,M)]^T$. The vector $\tilde{c}_l$ may represent the $l^{th}$ BT 107 measurements of M parameter nodes, and may be $\tilde{c}_l = k_l \times c + n_{c_l}$, where c may be an M×1 vector of the parameter node 108 terms, and $n_{c_l}$ may be the $l^{th}$ row of the matrix $n_{P \times M}$. Thus, each row of the matrix $\tilde{R}$ may provide a first-order estimate of the unknown parameter node 108 terms c.

In block 1002, the estimate of the unknown parameter node terms may be improved. The estimate of the unknown parameter terms, for example, the first order estimate in rows of matrix $\tilde{R}$, may be improved using prior estimates of the BT offsets k, for example, the first order estimates in the columns of matrix $\tilde{R}$. The estimate may be improved using Wiener filtering. An estimate $\hat{k}$ of the BT 107 offsets k may be available, as in block 1001. Similarly, an estimate of the variances of the individual terms of the vector of the corresponding estimation noise $n_k$ may also be formed, as in block 1001. Using the partial knowledge $\hat{k}$ of the BT offsets k, the estimate of the unknown parameter node terms c may be improved.

The normalized receiver measurement matrix $\tilde{R}_{L \times M}$ may be transformed, using the estimate vector $\hat{k}$, to a form that contains only the unknown $c_m$ terms, $\tilde{C}_{L \times M} = \tilde{K}_{L \times L}^{-1} \times \tilde{R}_{L \times M} \sim 1_{L \times M} + C_{M \times M}$. The $m^{th}$ column may have L different estimates of a single unknown variable $c_m$, and may be represented as $$\begin{bmatrix} c_m(1) \\ \vdots \\ c_m(L) \end{bmatrix} = \begin{bmatrix} 1 \\ \vdots \\ 1 \end{bmatrix}_{L \times 1} c_m + \begin{bmatrix} n_{c_m}(1) \\ \vdots \\ n_{c_m}(L) \end{bmatrix}.$$

These estimates may be combined using a weight vector w whose $l^{th}$ element, $w_l$, may be inversely proportional to the variance of the corresponding noise term $n_{c_m}0)$.

The M such estimates $\tilde{c}_m$ may collected in a single vector $\tilde{c}$. The variances of the estimates $\tilde{c}_m$ may be updated by taking the harmonic mean of the individual variances.

In block 1003, the estimate of the BT offsets may be improved. The estimate of the BT 107 offsets k may be improved using prior estimates of the parameter node 108 terms c. The estimate may be improved using Wiener filtering. An estimate $\tilde{c}$ of the unknown parameters node 108 terms c and the variances of the elements of vector of the corresponding estimation noise $n_c$ may be available, for example, as determined in block 1002. Using the partial knowledge $\tilde{c}$ of the parameter node 108 terms c, the estimate of the BT 107 unknown offsets k may be improved.

The estimated vector $\tilde{c}$ may be converted to a diagonal matrix $\tilde{C}_{M \times M}$. The normalized receiver measurement matrix $\tilde{R}_{L \times M}$ may be transformed to a form that contains only the unknown $k_l$ terms, $\tilde{K}_{M \times L} = \tilde{C}_{M \times M}^{-1} \times (\tilde{R}_{L \times M})^T \sim 1_{M \times L} + K_{L \times L}$. These estimates may be combined, for example, as in block 1002. The variances of the estimates $\hat{k}_1$ may be updated by taking the harmonic mean of the individual variances.

In block 1004, the counter n may be incremented.

In block 1005, if the iterative parameter estimation has reached a desired accuracy in estimation of the perturbation at the BTs 107 and the value of the parameter nodes 108, flow ends. Otherwise, flow proceeds back to block 1002, where the updated estimates in $\tilde{c}$ and $\tilde{k}$ may be used.

Iterative parameter estimation may have better optimality, including robustness to noise and measurement instrument failures, computational simplicity, ability to resolve the phase ambiguity and ability to handle nonlinear models of the measurements than alternative methods of parameter estimation. For example, iterative parameter estimation may outperform the selective daisy chain method, both in accuracy and in robustness to instrument failures, since iterative parameter estimation may use all the available information in all the measurement sets, and may not throw away the information not belonging to the selected paths.

The computational cost of iterative parameter estimation may be approximately an order of magnitude smaller than the maximal daisy chain when the total number of parameters and measurement sets increases above 100. Iterative parameter estimation may not suffer from the phase ambiguity problem.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wire line varieties thereof, and/or any other computerized device capable of configuration for receiving, storing and/or processing data for standalone application and/or over a networked medium or media. Examples of communication media that can be employed include, without limitation, wireless data networks, wire line networks, and/or a variety of networked media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details; materials and arrangement of elements, steps, structures, and/or parts may be made within the principle and scope of the invention without departing from the invention as described in the following claims.

What is claimed is:

1. A method for iterative estimation of a set of unknown channel parameters in a beamforming network comprising:

determining a first order estimate of offsets at measurement nodes and a confidence in the initial estimate of the offsets at the measurement nodes; and
iterating, until a desired estimation accuracy is obtained:
  determining an improved estimate of a parameter set, and a confidence in the improved estimate, using the prior estimate of the offsets at the measurement nodes; and
  determining an improved estimate of the offsets at the measurement nodes, and the associated confidence values, using the prior estimate of the parameter set and the corresponding confidence values, wherein the measurement nodes on a forward link collect channel information corresponding to a Geostationary satellite's forward link, and wherein a Hybrid Matrix assembly is a part of a satellite payload, send the measured channel information to a central beamforming network over a Wide Area Network (WAN) fiber link,
wherein the Hybrid Matrix effects are taken into account and propagation delays are compensated for using a linear predictive scheme in processing of a measurement matrix $R_{L \times M}$ prepared using the data on the WAN, and
wherein on a return link, beacon transmitters send pilot signals that are received at the beamforming network, wherein measurements of the pilot signals are used to formulate the matrix $R_{L \times M}$.

2. The method of claim 1, wherein the parameter estimation extracts the estimates of two different sets, $c_{M \times 1}$ and $k_{L \times 1}$, of unknown complex-valued parameters, from their coupled, intermittent and noisy measurements collected in the measurement matrix $R_{L \times M}$.

3. The method of claim 2, wherein faults and outages in the measurement matrix $R_{L \times M}$ are accounted for resulting in graceful performance degradation as the unavailability of the measurements increases.

4. The method of claim 1, wherein the iterating further comprises passing from one iteration to the next, the estimates of the unknown variables, and the confidence in the estimates.

5. The method of claim 1, further comprising:
self-initializing by using an arbitrary row or column of an observation matrix as an initial seed; and
iterating using multiple instantiations, where each instantiation uses a different row or column of the observation matrix.

6. The method of claim 1, wherein one of the measurement nodes and the beacon transmitters are part of one of a beam forming network, a distributed MIMO architecture, and a wireless communication system with macro-diversity.

7. A method for iterative estimation of a set of unknown channel parameters in a beamforming network comprising:
determining a first order estimate of offsets at measurement nodes and a confidence in the initial estimate of the offsets at the measurement nodes; and
iterating, until a desired estimation accuracy is obtained:
  determining an improved estimate of a parameter set, and a confidence in the improved estimate, using the prior estimate of the offsets at the measurement nodes; and
  determining an improved estimate of the offsets at the measurement nodes, and the associated confidence values, using the prior estimate of the parameter set and the corresponding confidence values,
wherein determining the first order estimate of the measurement offsets comprises:
using an arbitrary $m^{th}$ column of a normalized matrix $\tilde{R}_{L \times M}$ of measurements to determine a vector $\tilde{k}_m$ according to $\tilde{k}_m = [\tilde{R}(1,m), \tilde{R}(2,m), \ldots, \tilde{R}(L,m)]^T$, where the vector $\tilde{k}_m$ represents a parameter m as measured at L measurement nodes and the normalized matrix $\tilde{R}_{L \times M}$ is a normalized set of measurements.

8. A method for iterative estimation of a set of unknown channel parameters in a beamforming network comprising:
determining a first order estimate of offsets at measurement nodes and a confidence in the initial estimate of the offsets at the measurement nodes;
determining a first order estimate of the channel parameter set, wherein determining the first order estimate comprises:
using an arbitrary $l^{th}$ row of a normalized matrix $\tilde{R}_{L \times M}$ of measurements to determine a vector $\tilde{c}_l$ according to $\tilde{c}_l = [\tilde{R}(l,1), \tilde{R}(l,2), \ldots, \tilde{R}(l,M)]^T$, where the vector $\tilde{c}_l$ represents the $l^{th}$ measurement nodes measurements of M parameters, and the normalized matrix $\tilde{R}_{L \times M}$ is a normalized set of measurements: and
iterating, until a desired estimation accuracy is obtained:
  determining an improved estimate of the channel parameter set, and a confidence in the improved estimate, using the prior estimate of the offsets at the measurement nodes; and
  determining an improved estimate of the offsets at the measurement nodes, and the associated confidence values, using the prior estimate of the parameter set and the corresponding confidence values.

9. A method for iterative estimation of a set of unknown channel parameters in a beamforming network comprising:
determining a first order estimate of offsets at measurement nodes and a confidence in the initial estimate of the offsets at the measurement nodes; and
iterating, until a desired estimation accuracy is obtained:
  determining an improved estimate of a parameter set, and a confidence in the improved estimate, using the prior estimate of the offsets at the measurement nodes; and
  determining an improved estimate of the offsets at the measurement nodes, and the associated confidence values, using the prior estimate of the parameter set and the corresponding confidence values,
wherein determining the improved estimate of the parameter set, using the first order estimate of offsets at the measurement nodes, comprises:
transforming a normalized receiver measurement matrix $\tilde{R}_{L \times M}$ using a parameter set vector $\tilde{k}$ to a form that contains only the unknown $c_m$ terms, $\tilde{C}_{L \times M} = \tilde{K}_{L \times L}^{-1} \times \tilde{R}_{L \times M} - 1_{L \times M} + C_{M \times M}$ where an $m^{th}$ column has L different estimates of a single unknown variable $c_m$, and is represented as $$\begin{bmatrix} c_m(1) \\ \vdots \\ c_m(L) \end{bmatrix} = \begin{bmatrix} 1 \\ \vdots \\ 1 \end{bmatrix}_{L \times 1} c_m + \begin{bmatrix} n_{c_m}(1) \\ \vdots \\ n_{c_m}(L) \end{bmatrix};$$

combining the L estimates using a weight vector w whose $l^{th}$ element, $w_l$ is inversely proportional to a variance of a corresponding noise term $n_{c_m}(l)$;
collecting M estimates $\tilde{c}_m$ in a single vector $\tilde{c}$; and
setting a variance $\sigma_{l,m}^2$ to a high number, and a Signal to Noise Ratio a low value, if the measurement $\tilde{R}_{l,m}$ is not available due to lack of connections or due to a failure of the beacon transmitter.

10. A method for iterative estimation of a set of unknown channel parameters in a beamforming network comprising:
  determining a first order estimate of offsets at measurement nodes and a confidence in the initial estimate of the offsets at the measurement nodes; and
  iterating, until a desired estimation accuracy is obtained:
    determining an improved estimate of a parameter set, and a confidence in the improved estimate, using the prior estimate of the offsets at the measurement nodes; and
    determining an improved estimate of the offsets at the measurement nodes, and the associated confidence values, using the prior estimate of the parameter set and the corresponding confidence values,
  wherein determining the improved estimate of the offsets at the measurement nodes, using the improved estimate of the parameter set, comprises:
    converting an estimated vector $\tilde{c}$ to a diagonal matrix $\tilde{C}_{M \times M}$;
    transforming a normalized receiver measurement matrix $\tilde{R}_{L \times M}$ to a form that contains only the unknown $k_l$ terms, $\tilde{K}_{M \times L} = \tilde{C}_{M \times M}^{-1} \times (\tilde{R}_{L \times M})^T \sim 1_{M \times L} + K_{L \times L}$;
    combining the L estimates using a weight vector w whose $1^{th}$ element, $w_1$ is inversely proportional to a variance of a corresponding noise term $n_{c_m}(1)$; and
    setting a variance $\sigma_{l,m}^2$ to a high number, and a Signal to Noise Ratio a low value, if the measurement $\tilde{R}_{l,m}$ is not available due to lack of connections or due to a failure of the beacon transmitter.

11. A system for iterative parameter estimation comprising:
  a plurality of measurement nodes on a forward link and a plurality of beacon transmitters on a return link that are geographically separated and have an partial visibility to a full antenna array, and that introduce an unknown offset in a partial measurement of an antenna array channel parameter set; and
  a signal processing system, wherein the signal processing system is configured to estimate parameters affecting the antenna array using measurements from the measurement nodes by determining a first order estimate of the offsets due either to the measurement node or the beacon transmitter and confidence in the estimates, and iteratively the prior estimate of the offsets due to the measurement node or the beacon transmitter and the corresponding confidence values to determine an improved estimate of the parameters and the corresponding confidence values, wherein the measurement nodes on the forward link collect channel information corresponding to a Geostationary satellite's forward link, and wherein a Hybrid Matrix assembly is a part of a satellite payload, send the measured channel information to a central beamforming network over a Wide Area Network (WAN) fiber link,
  wherein the Hybrid Matrix effects are taken into account and propagation delays are compensated for using a linear predictive scheme in processing of a measurement matrix $R_{L \times M}$ prepared using the data on the WAN, and
  wherein on the return link, beacon transmitters send pilot signals that are received at the beamforming network, wherein measurements of the pilot signals are used to formulate the matrix $R_{L \times M}$.

12. The system of claim 11, wherein the signal processing system is further configured to:
  repeatedly improve the improved estimate of the offsets and improve the improved estimate of the parameters until an estimate with the desired accuracy is reached.

13. The system of claim 11, wherein the measurement nodes and the beacon transmitters are part of one of a ground-based beam former, a terrestrial D-MIMO system, and a Wireless Sensor Network (WSN).

14. A system for iterative parameter estimation comprising:
  a plurality of measurement nodes on a forward link and a plurality of beacon transmitters on a return link that are geographically separated and have an partial visibility to a full antenna array, and that introduce an unknown offset in a partial measurement of an antenna array channel parameter set; and
  a signal processing system, wherein the signal processing system is configured to estimate parameters affecting the antenna array using measurements from the measurement nodes by determining a first order estimate of the offsets due either to the measurement node or the beacon transmitter and confidence in the estimates, and iteratively the prior estimate of the offsets due to the measurement node or the beacon transmitter and the corresponding confidence values to determine an improved estimate of the parameters and the corresponding confidence values,
  wherein the signal processing system is configured to determine a first order estimate of a parameter set by:
    using an arbitrary $m^{th}$ column of a normalized matrix $\tilde{R}_{L \times M}$ of measurements to determine a vector $\tilde{k}_m$ according to $\tilde{k}_m = [\tilde{R}(1,m), \tilde{R}(2,m), \ldots, \tilde{R}(L,m)]^T$, where the vector $\tilde{k}_m$ represents a parameter m as measured at L measurement nodes on the forward link and using the beacon transmitters on the return link and the normalized matrix $\tilde{R}_{L \times M}$ is a normalized set of measurements.

15. A system for iterative parameter estimation comprising:
  a plurality of measurement nodes on a forward link and a plurality of beacon transmitters on a return link that are geographically separated and have an partial visibility to a full antenna array, and that introduce an unknown offset in a partial measurement of an antenna array channel parameter set; and
  a signal processing system, wherein the signal processing system is configured to estimate parameters affecting the antenna array using measurements from the measurement nodes by determining a first order estimate of the offsets due either to the measurement node or the beacon transmitter and confidence in the estimates, and iteratively the prior estimate of the offsets due to the measurement node or the beacon transmitter and the corresponding confidence values to determine an improved estimate of the parameters and the corresponding confidence values,
  wherein the signal processing system is configured to determine a first order estimate of offsets at the beacon transmitters and measurement nodes by:
    using an arbitrary $1^{th}$ row of a normalized matrix $\tilde{R}_{L \times M}$ of measurements to determine a vector $\tilde{c}_l$ according to $\tilde{c}_l = [\tilde{R}(1,1), \tilde{R}(1,2), \ldots, \tilde{R}(1,M)]^T$, where the vector $\tilde{c}_l$ represents the $1^{th}$ beacon transmitter or measurement node measurements of M parameters, and the normalized matrix $\tilde{R}_{L \times M}$ is a normalized set of measurements.

16. A system for iterative parameter estimation comprising:
  a plurality of measurement nodes on a forward link and a plurality of beacon transmitters on a return link that are geographically separated and have an partial visibility to a full antenna array, and that introduce an unknown offset in a partial measurement of an antenna array channel parameter set; and
  a signal processing system, wherein the signal processing system is configured to estimate parameters affecting the antenna array using measurements from the measurement nodes by determining a first order estimate of the offsets due either to the measurement node or the beacon transmitter and confidence in the estimates, and iteratively the prior estimate of the offsets due to the measurement node or the beacon transmitter and the corresponding confidence values to determine an improved estimate of the parameters and the corresponding confidence values, wherein the signal processing system is configured to determine an improved estimate of the parameters using the first order estimate of offsets at the beacon transmitters and measurement nodes by:

transforming a normalized receiver measurement matrix $\tilde{R}_{L \times M}$ using a parameter set vector $\tilde{k}$ to a form that contains only the unknown $c_m$ terms, $\tilde{C}_{L \times M} = \tilde{K}_{L \times L}^{-1} \times \tilde{R}_{L \times M} \sim 1_{L \times M} + C_{M \times M}$ where an $m^{th}$ column has L different estimates of a single unknown variable $c_m$, and is represented as $$\begin{bmatrix} c_m(1) \\ \vdots \\ c_m(L) \end{bmatrix} = \begin{bmatrix} 1 \\ \vdots \\ 1 \end{bmatrix}_{L \times 1} c_m + \begin{bmatrix} n_{c_m}(1) \\ \vdots \\ n_{c_m}(L) \end{bmatrix};$$

combining the L estimates using a weight vector w whose $1^{th}$ element, $w_1$ is inversely proportional to a variance of a corresponding noise term $n_{c_m}(1)$;

collecting M estimates $\tilde{c}_m$ in a single vector $\tilde{c}$; and setting a variance $\sigma_{l,m}^2$ to a high number, and a Signal to Noise Ratio a low value, if the measurement $\tilde{R}_{l,m}$ is not available due to lack of connections or due to a failure of the beacon transmitter.

17. A system for iterative parameter estimation comprising:

a plurality of measurement nodes on a forward link and a plurality of beacon transmitters on a return link that are geographically separated and have an partial visibility to a full antenna array, and that introduce an unknown offset in a partial measurement of an antenna array channel parameter set; and a signal processing system, wherein the signal processing system is configured to estimate parameters affecting the antenna array using measurements from the measurement nodes by determining a first order estimate of the offsets due either to the measurement node or the beacon transmitter and confidence in the estimates, and iteratively the prior estimate of the offsets due to the measurement node or the beacon transmitter and the corresponding confidence values to determine an improved estimate of the parameters and the corresponding confidence values, wherein the signal processing system is configured to determine an improved estimate of the offsets at the measurement nodes using the improved estimate of the parameter set by:

converting an estimated vector $\tilde{c}$ to a diagonal matrix $\tilde{C}_{M \times M}$;

transforming a normalized receiver measurement matrix $\tilde{R}_{L \times M}$ to a form that contains only the unknown $k_l$ terms, $\tilde{K}_{M \times L} = \tilde{C}_{M \times M}^{-1} \times (\tilde{R}_{L \times M})^T \sim 1_{M \times L} + K_{L \times L}$; and combining the L estimates using a weight vector w whose $1^{th}$ element, $w_1$ is inversely proportional to a variance of a corresponding noise term $n_{c_m}(1)$.

* * * * *